United States Patent
Nomula et al.

(10) Patent No.: US 12,450,506 B2
(45) Date of Patent: Oct. 21, 2025

(54) SYSTEM AND METHOD FOR RECOMMENDING ACTIONS ON A DEVICE

(71) Applicant: Voicemonk, Inc., Sunnyvale, CA (US)

(72) Inventors: Jagadeshwar Nomula, Fremont, CA (US); Vineel Yalamarthy, Rajahmundry (IN)

(73) Assignee: Voicemonk. Inc., Sunnyvale, CA (US)

( * ) Notice: Subject to any disclaimer, the term of this patent is extended or adjusted under 35 U.S.C. 154(b) by 0 days.

(21) Appl. No.: 19/087,499

(22) Filed: Mar. 22, 2025

(65) Prior Publication Data

US 2025/0217678 A1    Jul. 3, 2025

Related U.S. Application Data

(63) Continuation of application No. 16/245,188, filed on Jan. 10, 2019.

(60) Provisional application No. 62/616,428, filed on Jan. 12, 2018.

(51) Int. Cl.
| | |
|---|---|
| *G06N 5/04* | (2023.01) |
| *G06F 11/30* | (2006.01) |
| *G06F 11/34* | (2006.01) |
| *G06N 3/006* | (2023.01) |
| *G06N 20/00* | (2019.01) |
| *G06F 3/0482* | (2013.01) |

(52) U.S. Cl.
CPC ........... *G06N 5/04* (2013.01); *G06F 11/3013* (2013.01); *G06F 11/3438* (2013.01); *G06N 3/006* (2013.01); *G06N 20/00* (2019.01); *G06F 3/0482* (2013.01)

(58) Field of Classification Search
CPC .......... G06N 5/04; G06N 3/006; G06N 20/00; G06F 11/3013; G06F 11/3438; G06F 3/0482

See application file for complete search history.

(56) References Cited

U.S. PATENT DOCUMENTS

| | | | |
|---|---|---|---|
| 9,985,786 B1 * | 5/2018 | Bhabbur | G06F 3/0488 |
| 10,885,444 B2 * | 1/2021 | Biswas | G06F 16/24578 |
| 10,949,432 B1 * | 3/2021 | Grayson | G06F 16/9035 |
| 11,038,974 B1 * | 6/2021 | Koukoumidis | G06F 40/274 |
| 11,188,840 B1 * | 11/2021 | Rivera | G06F 16/9535 |
| 11,515,030 B2 * | 11/2022 | Mansi | G16H 20/40 |
| 12,039,583 B2 * | 7/2024 | Nomula | G06Q 30/0617 |
| 2008/0005736 A1 * | 1/2008 | Apacible | G06F 12/0868 |
| | | | 718/100 |
| 2011/0028138 A1 * | 2/2011 | Davies-Moore | G06F 3/04817 |
| | | | 455/418 |

(Continued)

FOREIGN PATENT DOCUMENTS

| | | | | |
|---|---|---|---|---|
| WO | WO-2007094816 A2 * | 8/2007 | ........... | G06F 11/3013 |
| WO | WO-2017100357 A1 * | 6/2017 | ........... | G06F 17/218 |

*Primary Examiner* — Rashawn N Tillery

(57) ABSTRACT

A system for recommending actions on a device includes at least one processor configured to record actions, which are performed by a user on the device, across a plurality of applications present on the device. The processor develops a personalized model, which is specific to a user of the device, for recommending actions, wherein the personalized model is at least based on the recorded actions. The processor recommends a follow on action to be carried out on a second application after a first action is carried out on a first application based on the personalized model.

1 Claim, 11 Drawing Sheets

(56) References Cited

U.S. PATENT DOCUMENTS

| | | | | |
|---|---|---|---|---|
| 2014/0032666 | A1* | 1/2014 | Chan | H04L 67/02 |
| | | | | 709/204 |
| 2014/0129627 | A1* | 5/2014 | Baldwin | H04L 67/306 |
| | | | | 709/204 |
| 2014/0278998 | A1* | 9/2014 | Systrom | G06Q 30/0277 |
| | | | | 705/14.57 |
| 2015/0228062 | A1* | 8/2015 | Joshi | G06V 10/58 |
| | | | | 382/110 |
| 2015/0279112 | A1* | 10/2015 | Meftah | G06T 19/006 |
| | | | | 345/633 |
| 2015/0286897 | A1* | 10/2015 | Spaith | H04N 1/33353 |
| | | | | 382/224 |
| 2015/0356501 | A1* | 12/2015 | Gorjestani | G06Q 10/0833 |
| | | | | 705/333 |
| 2016/0050289 | A1* | 2/2016 | Cohen | H04L 67/30 |
| | | | | 709/204 |
| 2016/0171379 | A1* | 6/2016 | Baker | G06Q 10/06 |
| | | | | 706/46 |
| 2016/0277312 | A1* | 9/2016 | Ferris | H04L 41/20 |
| 2017/0039886 | A1* | 2/2017 | Bitran | G09B 19/0092 |
| 2017/0076208 | A1* | 3/2017 | Huang | G06F 16/9535 |
| 2017/0098197 | A1* | 4/2017 | Yu | G16H 10/60 |
| 2017/0109656 | A1* | 4/2017 | Cook | G06N 5/02 |
| 2017/0177600 | A1* | 6/2017 | Zhang | G06F 16/9038 |
| 2018/0075516 | A1* | 3/2018 | Barkan | G06N 3/047 |
| 2018/0181719 | A1* | 6/2018 | Balian | G16H 10/60 |
| 2018/0183891 | A1* | 6/2018 | Zhang | H04L 67/125 |
| 2018/0225739 | A1* | 8/2018 | Shaw | G06F 16/9535 |
| 2018/0268737 | A1* | 9/2018 | Garnavi | G06N 3/084 |
| 2018/0300046 | A1* | 10/2018 | Goyal | G06F 16/532 |
| 2019/0042976 | A1* | 2/2019 | Tanglertsampan | G06N 20/00 |
| 2019/0050952 | A1* | 2/2019 | Goldberg | G06Q 10/087 |
| 2019/0087691 | A1* | 3/2019 | Jelveh | G06N 3/084 |
| 2019/0124272 | A1* | 4/2019 | O'Neill | H04N 21/41407 |
| 2019/0139092 | A1* | 5/2019 | Nomula | G06Q 30/0255 |
| 2019/0147334 | A1* | 5/2019 | Lisowska | G06N 3/088 |
| | | | | 706/25 |
| 2019/0188013 | A1* | 6/2019 | Krishna | G06N 20/00 |
| 2019/0258498 | A1* | 8/2019 | Chandan | G06F 40/20 |
| 2019/0318759 | A1* | 10/2019 | Doshi | G10L 15/04 |
| 2019/0340759 | A1* | 11/2019 | Kang | G06F 18/24 |
| 2020/0082169 | A1* | 3/2020 | Lu | G08B 21/0476 |
| 2020/0088463 | A1* | 3/2020 | Jeong | G06F 3/167 |
| 2020/0125586 | A1* | 4/2020 | Rezaeian | G06F 3/048 |
| 2020/0134488 | A1* | 4/2020 | Kim | G06F 3/04842 |
| 2021/0042338 | A1* | 2/2021 | Smutko | G06F 11/3438 |
| 2021/0297527 | A1* | 9/2021 | Nitidharmatut | H04M 3/247 |
| 2023/0124889 | A1* | 4/2023 | Robert Jose | G06F 40/226 |
| | | | | 704/9 |

* cited by examiner

SYSTEM AND METHOD FOR RECOMMENDING ACTIONS ON A DEVICE

CROSS-REFERENCE TO RELATED APPLICATION

This application is a continuation of Ser. No. 16/245,188, filed Jan. 10, 2019, which claims priority from provisional application U.S. 62/616,428. This application also claims the benefit of patent application U.S. Ser. No. 13/089,772 with title "System and method for presenting targeted content", patent application U.S. Ser. No. 15/245,208 with title "System and method for presenting targeted content", patent application U.S. Ser. No. 13/208,338 with title "Method and system for resolving search queries that are inclined towards social activities", patent application Ser. No. 15/391,837 with title "System for assisting in marketing, patent application", patent application Ser. No. 15/356,512 with title "Systems and methods for virtual agents to help customers and businesses", patent application U.S. Ser. No. 15/391,837 with title "System to assist users of a software application", patent application number U.S. Ser. No. 16/006,850 with title "Advanced techniques to improve content presentation experiences for businesses and users" and patent application number U.S. Ser. No. 16/245,188 with title "System and Method for Recommending Actions on a Device". The entire disclosures of all said prior applications are hereby incorporated by reference.

BACKGROUND

Unless otherwise indicated herein, the materials described in this section are not prior art to the claims in this application and are not admitted to being prior art by inclusion in this section.

FIELD OF INVENTION

The subject matter in general relates to data processing. More particularly, but not exclusively, the subject matter relates to a system and method for content and action recommendation based on user behaviour, and other matters.

DISCUSSION OF RELATED ART

Smartphones have become commonplace and are being used for a wide variety of applications, such as getting information on a variety of subjects, communication and e-commerce, among others. Some of these applications, based on user activity, can recommend content to the user. As an example, FACEBOOK may recommend content based on activities of the user on FACEBOOK. Further, some of these applications are hardcoded to recommend actions. As an example, FACEBOOK may recommend uploading recently captured photos. However, such action recommendations are not customized, and consequently, may lead to inferior user experience.

Additionally, with an increase in the dependence on mobile applications, users often prefer online shopping over visiting brick and mortar stores. Some of these ecommerce applications use Augmented reality (AR) to enable visualization. For example, if the user wants to purchase a sofa set for a living room, using augmented reality, the user can visualize the sofa set in the living room. However, for this the user will have to choose a sofa set from furniture category of the ecommerce app, point the mobile camera at their living room and move the sofa set to the required space. These steps can be tedious and time consuming for a user.

Further, with the development in mobile technology, users prefer the mobile applications to complete the user instructions without the need for manually entering the user instruction in the applications. Some of these applications use virtual agent for enabling the user instructions. For example, the virtual agent may be triggered by hot keywords from the user's voice instruction to complete the intent of the user. However, the virtual agent can only be triggered by the user's speech and may not use the previous information about the user to generate content recommendations to complete user instructions in an application.

SUMMARY

In one aspect, a system is provided for recommending actions on a device. The system includes at least one processor configured to record actions, which are performed by a user on the device, across a plurality of applications present on the device. The processor develops a personalized model, which is specific to a user of the device, for recommending actions, wherein the personalized model is at least based on the recorded actions. The processor recommends a follow on action to be carried out on a second application after a first action is carried out on a first application based on the personalized model.

In another aspect, the processor is configured to function as a virtual agent, wherein the virtual agent provides instruction to the second application to carry out the follow on action. In another aspect, the processor can be configured to function as a general virtual agent, wherein the general virtual agent can act on behalf of the user in accordance with the personalized model of the user.

In another aspect, the second application enables augmented reality, wherein the processor is configured to enable at least virtual placement of an item within a display depicting a real world scene. In another aspect, the processor can be configured to provide a general virtual assistant, such as a general virtual assistant that can assist the user with using augmented reality functions on a device.

BRIEF DESCRIPTION OF THE DIAGRAMS

This disclosure is illustrated by way of example and not limitation in the accompanying figures. Elements illustrated in the figures are not necessarily drawn to scale, in which like references indicate similar elements and in which.

Figure 3:
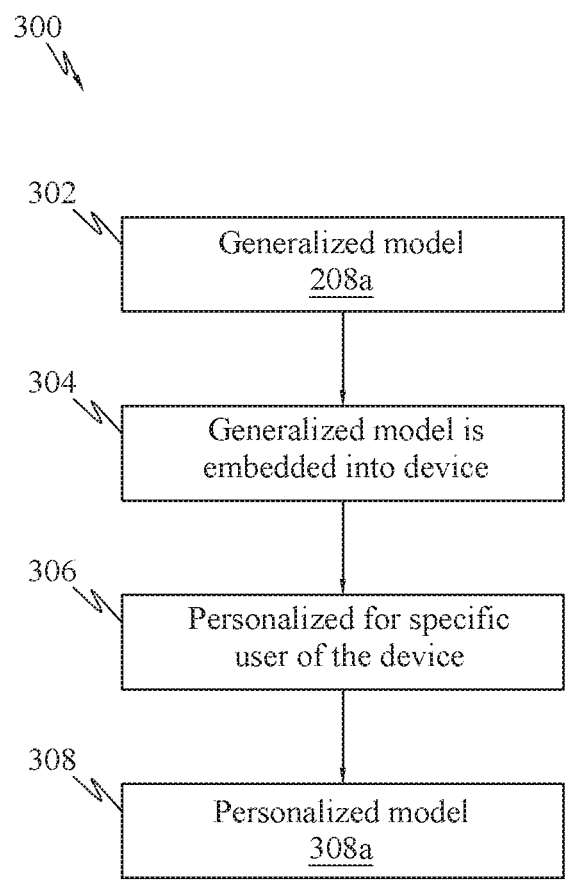

FIG. 3 is a flowchart 300 illustrating the steps involved in building a personalized model 308 *a* of the behaviour analyzer 102, in accordance with an embodiment.

Figure 4A:
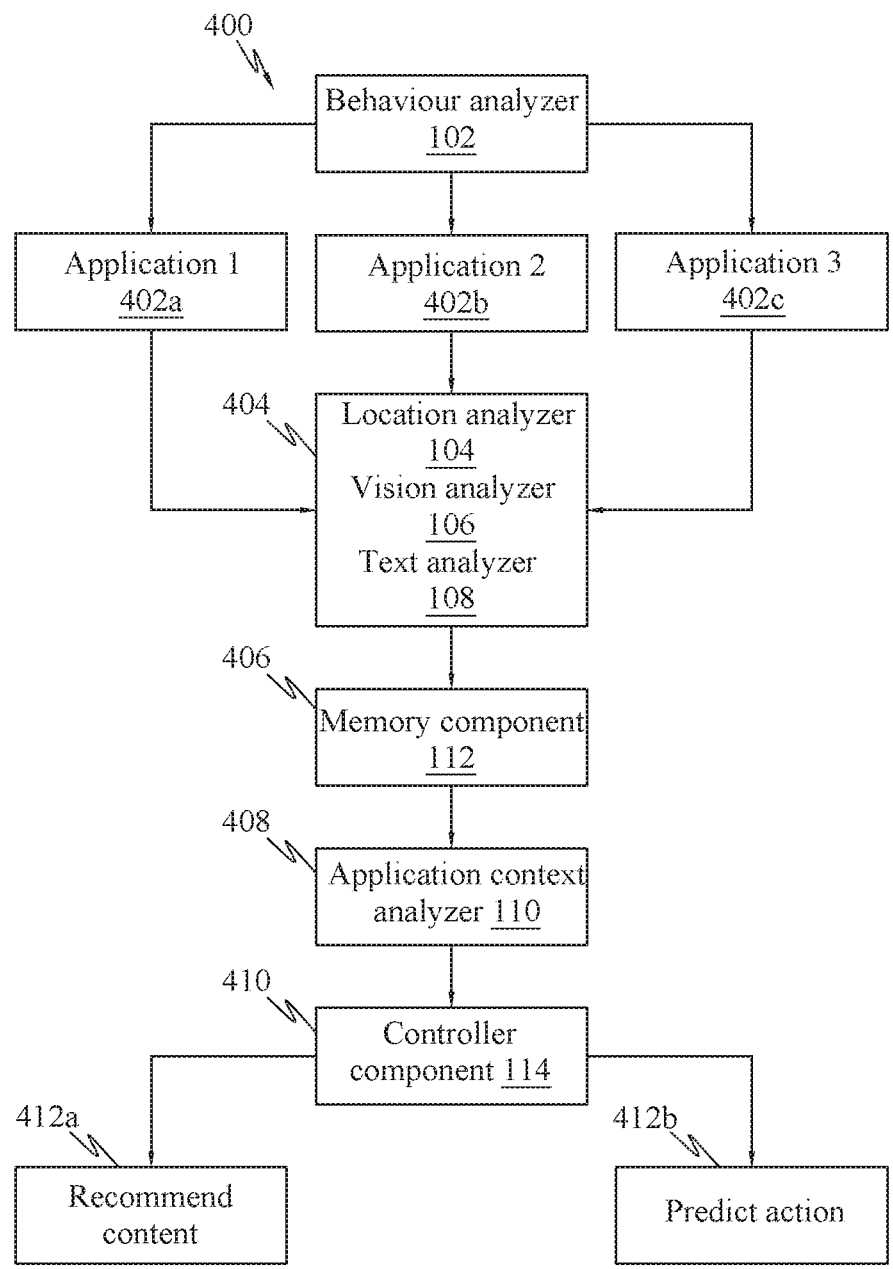

FIG. 4A is a flowchart 400 of an exemplary method for recommending content and predicting user actions, by the behaviour analyzer 102, in accordance with an embodiment.

FIG. 4B, FIG. 4C, FIG. 4D, FIG. 4E, and FIG. 4F illustrate user interfaces enabled by the behaviour analyzer 102, in accordance with an embodiment.

Figure 5:
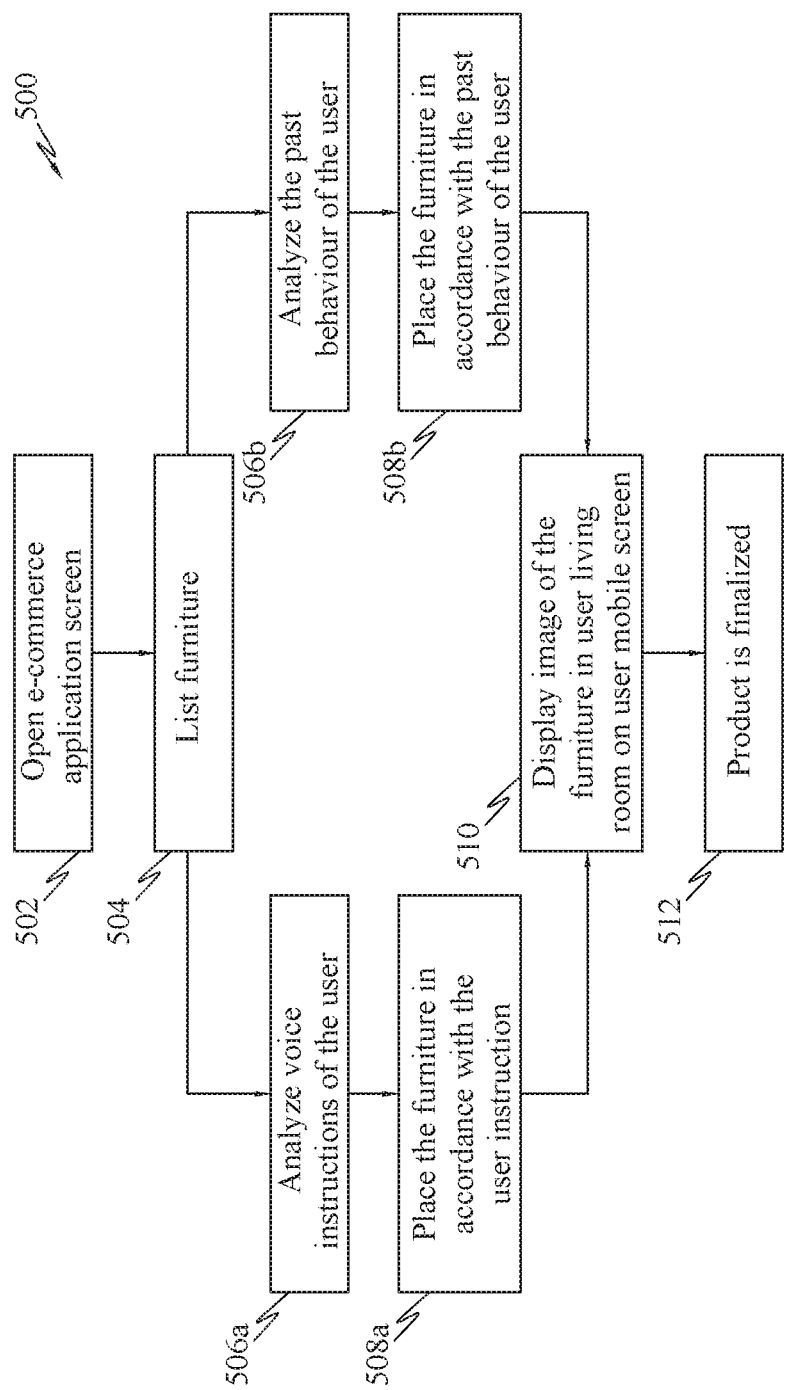

FIG. 5 is a flowchart of an exemplary method 500 enabled by a virtual agent facilitated by the behaviour analyzer 102, in accordance with an embodiment.

Figure 1:
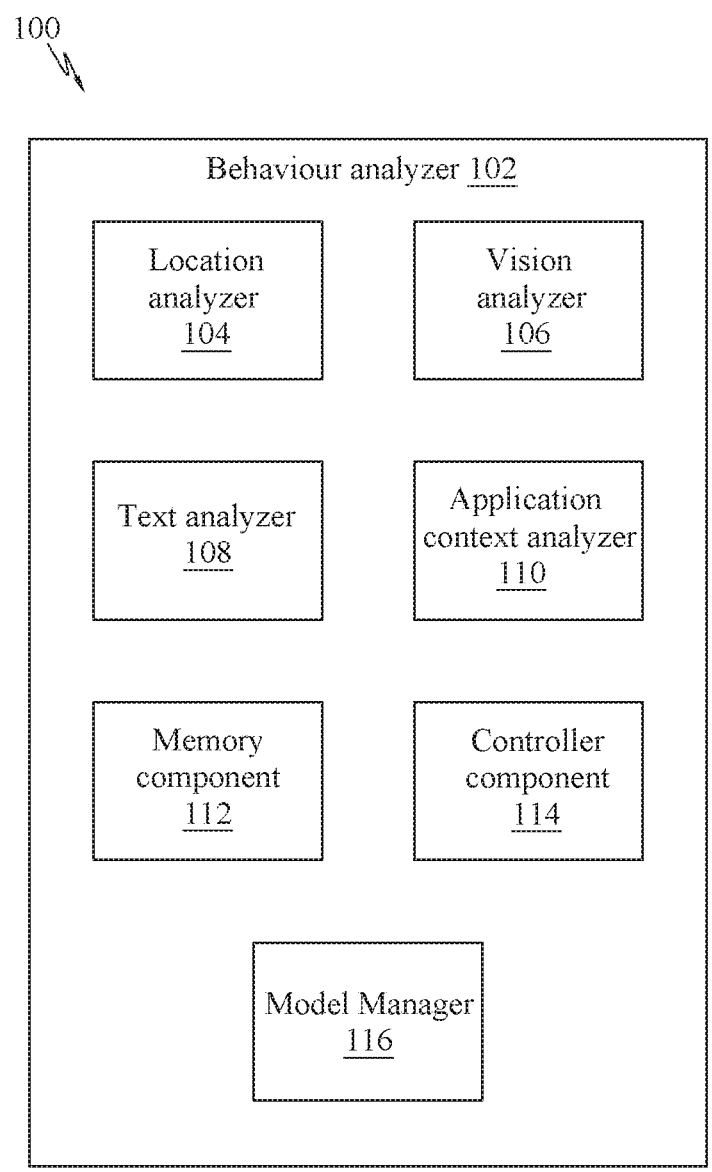
FIG. 1 is an exemplary block diagram illustrating software modules of a system 100 for recommending content and actions based on user behaviour, in accordance with an embodiment.
Figure 6:
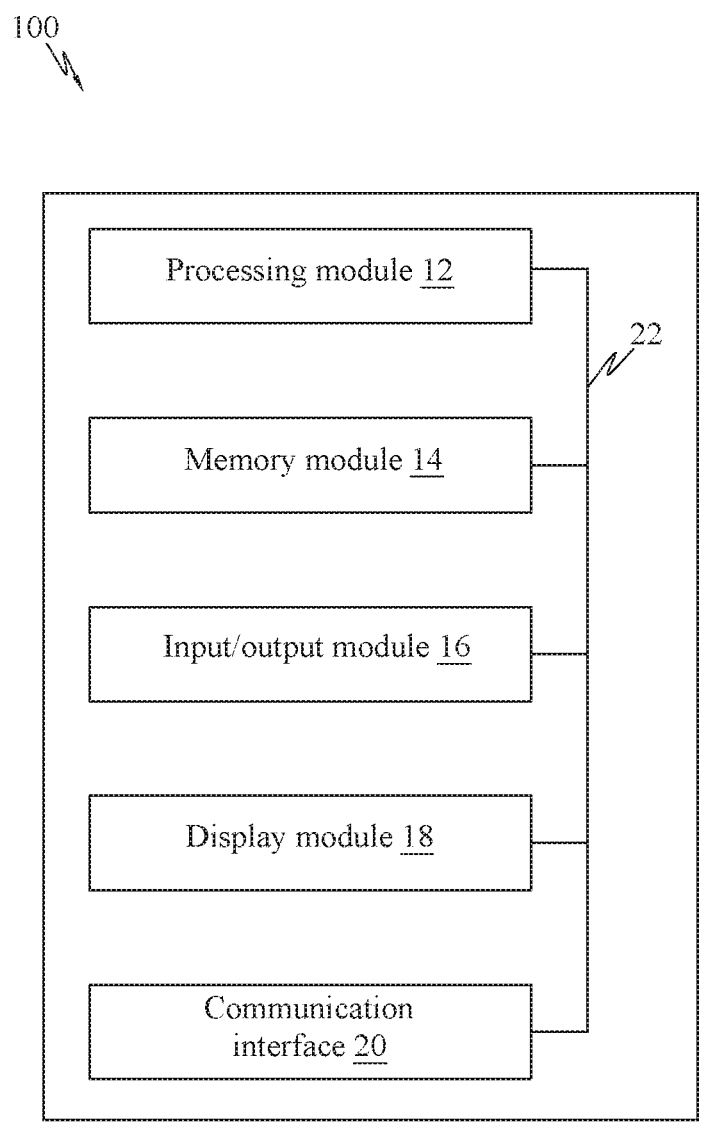

FIG. 6 is a block diagram illustrating hardware elements of the system 100 of FIG. 1, in accordance with an embodiment.

DETAILED DESCRIPTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

Referring to FIG. 1, a system 100 is provided for generating content and recommending actions. The system 100 is configured to generate content and recommend actions on a user device using a behaviour analyzer 102.

The behaviour analyzer 102 may be configured to learn the behaviour of a user of a device. The behaviour analyzer 102 may learn the behaviour of the user by continuously studying the interactions of the user with the device. The behaviour analyzer 102, may form a hypothesis on the activities of the user by continuously learning from the user interactions with different applications installed on the device and may generate content in a timely manner. The activities may include calling an individual, texting the individual after the phone call, capturing a photo, updating the photo on a social media, ordering food online and so on. The different applications installed on the device may be calling applications, messaging applications, call recorder, social media applications like FACEBOOK, INSTAGRAM, WHATSAPP and so on, online food ordering applications like SWIGGY, ZOMATO and so on. The device may be a mobile 414. As an example, a user may use the device to capture a photo using a photo capturing application. If the user generally posts the photo using another application, such as a social networking application, after capturing the photo, then there is a high probability that the user will share the currently captured photo on the social networking application. The behaviour analyzer 102 may have already learned about this behaviour of the user and would suggest the user to upload the photo on to the social networking application, after the photo is captured.

In an embodiment, to learn the user behaviour and predict the user actions, the behaviour analyzer 102 may have a location analyzer 104, a vision analyzer 106, a text analyzer 108, an application context analyzer 110, a memory component 112, a controller component 114 and a model manager 116.

The location analyzer 104 may be configured to identify the location of the user/device and the characteristics of the location. As an example, the location analyzer 104 may implement a triangulation method to determine the location of the user and may use available meta data around the location data to determine the characteristics of the location. The metadata may be an event entered by the user in the calendar application. The event may be a conference to be attended by the user on a specific date. As an example, the location analyzer 104 may determine that the user is in a conference room, based on the identified location and the metadata information from the calendar.

The vision analyzer 106 may be configured to analyse the images captured by the camera installed on the user device and the associated metadata. The metadata may be a birthday event, a picnic spot and so on. The vision analyzer 106 may also analyse the device screen. The vision analyzer 106 may break down the device screen into a series of pixels and then pass these series of pixels to a neural network. The neural network may be trained to recognize the visual elements within the frame of the device. By relying on a large database and noticing the emerging patterns, the vision analyzer 106 may identify position of faces, objects and items, among others, in the frame of the device. The vision analyzer 106 may thus act as the "human eye" for the device.

The text analyzer 108 may be configured to parse text in order to extract information. The text analyzer 108 may first parse the textual content and then extract salient facts about type of events, entities, relationships and so on. As an example, text analyzer 108 may identify the trend of messages the user may send to specific people.

The application context analyzer 110 may be configured to analyse the past behaviour of the user. For the behaviour analyzer 102 to predict the actions of the user, the past behaviour of the user should be studied. As an example, the user may call (using a first application) an individual. After the call ends, the user may send a text (using a second application) this individual. This series of behaviour (calling and then texting) may be repeated majority of the times the user makes phone calls to this specific person. The application context analyzer 110 may analyse this series of past behaviour of the user. The output of the application context analyzer 110 is to determine how the past behaviour of the user of the device will impact his future actions. The memory component 112 may be configured to store the previous events/actions corresponding to the user. In context of the above example, the series of actions spread across multiple applications, of the user (calling and then texting) may be stored in the memory component 112.

The controller component 114 may be configured to coordinate with the location analyzer 104, the vision analyzer 106, the text analyzer 108, the application context analyzer 110 and the memory component 112 to gather information of the behaviour of the user to predict the content and actions for the user.

The model manager 116 may manage a personalized model 308 a that is built for a specific user of the device. The model manager 116 may also learn to manage the behaviour of a new user of a device. The behaviour analyzer 102 may be personalized to predict the content and actions according to the individual's behaviour. The behaviour of one user may be different from that of another. As an example, a specific user may upload the photo captured (using first application) to a social media application (a second application) without editing (using a third application) the photo. Another user may upload the picture after editing them. The model manager 116 may be trained to learn the particular behaviour of the user of the device to personalize the behaviour analyzer 102. The model manager 116 may learn from the feedback on the content and action recommendations of the user.

The behaviour analyzer 102 may be implemented in the form of one or more processors and may be implemented as appropriate in hardware and software. Referring to FIG. 6, software implementations of the processing module 12 may include device-executable or machine-executable instructions written in any suitable programming language to perform the various functions described herein. The behaviour analyzer 102 can run as offline process, whenever the user starts an application or as a process which executes every 'x' minutes or so. The number 'x' can be a configurable parameter.

A generalized model 208 *a* may be trained based on a user cluster. The generalized model 208 *a* may be introduced in the user device. The model manager 116 of the behaviour analyzer 102 may then personalize the generalized model 208 *a*. As an example, as per a generalized model, the users of a specific cluster may capture a photo (using a first photo capturing application), edit the photo (using a second editing application) and uploading the edited photo to a first social networking application (using a third application). Whereas, a personalized model for a specific user could be, capture a photo (using the first photo capturing application), edit the photo (using the second editing application) and uploading the edited photo to a second social networking application (using a fourth application). In an embodiment, the model manager 116 may initialize the generalized model 208 *a* either during device setup or as part of the booting process.

Having discussed about the various modules involved in predicting the actions of the user and recommending content, the different implementations of the behaviour analyzer 102 is discussed hereunder.

The behaviour analyzer 102 may generate content and recommend actions for the user based on the past behaviour of the user. A generalized model 208 *a* may be trained on the user cluster. The generalized model 208 *a* may be trained for a group of users with similar profile. The generalized model 208 *a* may then be personalized for a specific user of the device, which may be called as personalized model 308 *a*. The behaviour analyzer 102 may record actions of the user, to personalize the generalized model 208 *a*. The actions may be performed across plurality of applications installed on the device. The personalized model 308 *a* may recommend actions based on the recorded actions and may recommend a follow on action to be carried out on a second application. As an example, the follow on action may be uploading a photo on a social networking application (second application) after the photo is captured using a mobile camera application (first application).

Figure 2:
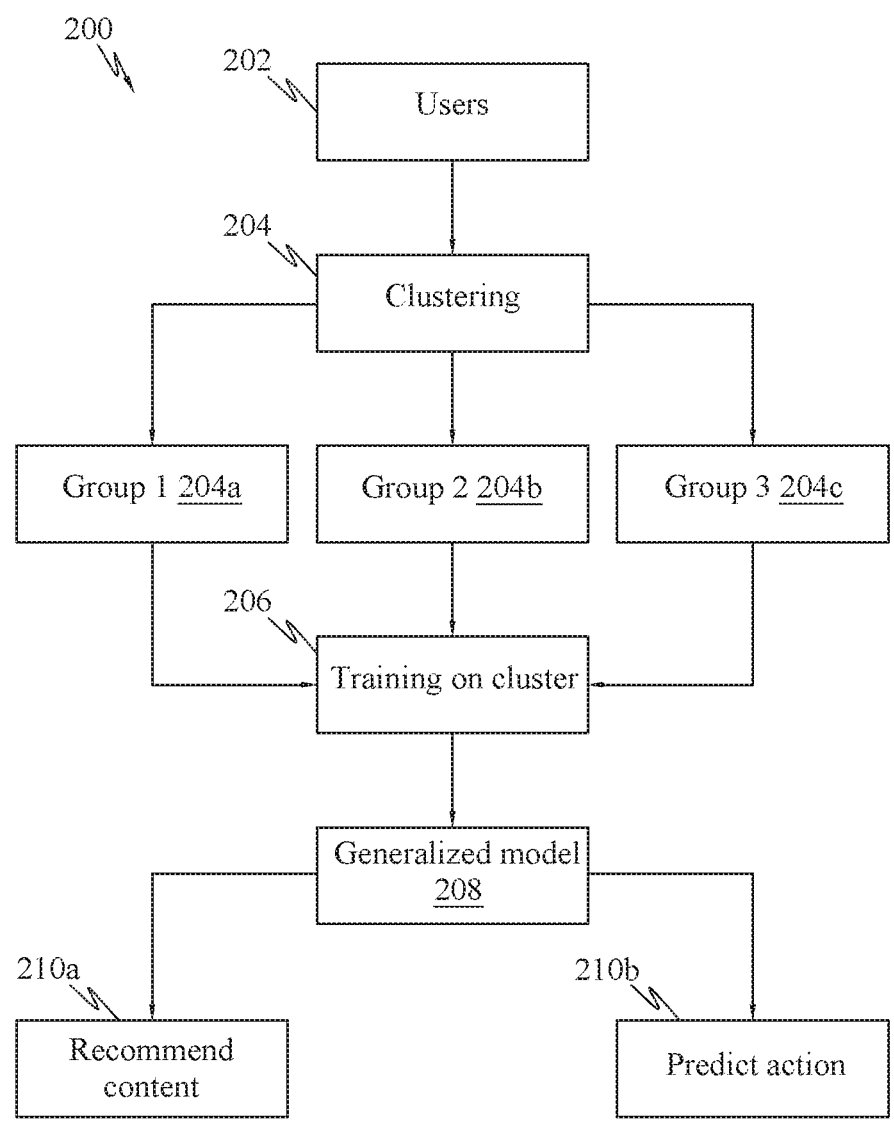
FIG. 2 is a flowchart 200 illustrating the steps involved in building a generalized model 208 *a*, in accordance with an embodiment.

Referring to FIG. 2, at step 204, the users may be clustered using a learning algorithm. The clustering of the users may result in generation of different user clusters, group 1 204 *a*, group 2 204 *b* and group 3 204 *c*. The generalized model 208 *a* may then be trained using a Neural network on the training data for the user clusters. Referring to step 210 *a* and 210 *b*, the trained generalized model 208 *a* may recommend content and predict actions for the users of specific clusters using a prediction algorithm.

Having provided an overview of the steps involved in building the generalized model 208 *a*, each of the steps is discussed in greater detail hereunder.

In an embodiment, referring to FIG. 2, at step 204, the users can be clustered using the learning algorithm. The learning algorithm may be K-means clustering algorithm. K-means clustering groups an unlabelled data. An unlabelled data includes data without defined categories or groups. All of the users may form the unlabelled data. The K-means clustering algorithm find groups in the unlabelled user data, with the number of groups represented by the variable "K". The algorithm works iteratively to assign each user (data point) to one of "K" groups based on the features of the user. The users may be clustered based on feature similarities. The features of the user may be age, behavioural characteristics, gender and so on. The output of K-means clustering algorithm may be clusters of users, group 1 204 *a*, group 2 204 *b* and group 3 204 *c*, wherein each cluster may have similar features.

At step 206, the user cluster may be trained using a deep Neural Network on large training data on the users of the cluster. The user cluster may be trained using the training data from the location analyzer 104, the vision analyzer 106, the text analyzer 108, the application context analyzer 110 and the memory component 112 within the user cluster. As an example, the user cluster may be trained to upload a photo on FACEBOOK using training data. The location analyzer 104 may have data about the location of the picture, the vision analyzer 106 may have the image that has to be uploaded, the application context analyzer 110 may have the data pertaining to the behaviour (uploading photo) of the cluster and this data may be stored in the memory component 112.

At step 208, the trained user cluster may form the generalized model 208 *a* for specific user cluster. At step 210 *a* and 210 *b*, the generalized model 208 *a* after learning the behavioural pattern of the cluster may recommend content and predict actions for the cluster based on the behavioural pattern of the cluster. In an embodiment, the generalized model 208 *a* may predict a sequence of actions for the user cluster by using a Recurrent Neural Network (RNN). RNN algorithm is designed to work with sequence predictions. Sequence is a stream of data which are interdependent. RNN algorithm will have an input loop, an output loop and hidden layers between the input loop and the output loop. The output from a previous step will be taken as input for a current step. In this way RNN creates a network of input loops, process these sequence of inputs that are dependent on each other to predict the final output sequence. The generalized model 208 *a* may continuously learn from the behavioural pattern of the cluster. As an example, the user may have a behavioural pattern of capturing a photo, editing the photo after capturing, uploading the photo on FACEBOOK and then sharing the same on INSTAGRAM. The RNN algorithm will process this sequence. The next time the user captures a photo and edit them, the generalized model 208 *a* will recommend the user to upload the photo on FACEBOOK and then to share the same on INSTAGRAM. In an embodiment, the generalized model 208 *a* may predict application actions for the user cluster by using a Deep Neural Network (DNN). The application actions may be sending a SMS (Short Message Service) to a friend, calling a merchant and so on.

Referring to FIG. 3, at step 304, the trained generalized model 208 a of the behaviour analyzer 102 may be embedded into the user device. The user may have carried out different actions across different application installed on the device before the generalized model is embedded on the device. When the generalized model 208 *a* is embedded on the device, these sequence of actions may be learned by the generalized model 208 *a*. The sequence of actions may be specific to a specific user of the device. The embedded generalized model 208 *a* may thus be personalized for the specific user of the device, at step 306. The personalization of the generalized model 208 *a* may generate a personalized model 308 *a* (step 308). The personalized model 208 *a* may predict follow up actions based on the sequence of actions of the user.

In an embodiment, the personalization of the behaviour analyzer 102 may be implemented using the learning algorithm. The learning algorithm may be Reinforcement Learning. Reinforcement Learning uses the concept of agent, actions, states and reward to attain a complex objective (content recommendation and action for the user of the device). As an example, the aggregated user behaviour, updates from the social media may be the state for the user. Content recommendation, displaying an application action may be the action of the algorithm. Correctly predicting the action at time "t" may be the reward function. In Reinforcement Learning, the agent (behaviour analyzer 102) may be provided with the state. The agent may then take an action for the corresponding state. If the agent is successful in predicting the action at time "t", then the agent will be rewarded with positive points ("+1"). If the agent is unsuccessful in predicting the action at time "t", then the agent will be punished with negative points ("−1"). The agent will try to maximize the cumulative reward functions to achieve the best possible action. To figure out the action, the behaviour analyzer 102 may implement policy learning algorithm. As an example, the behaviour analyzer 102 may recommend uploading a picture using a social networking application after capturing the picture. In case the user accepts the recommended action, then the behaviour analyzer 102 may be awarded a positive point. Else, the behaviour processor 102 may be awarded a negative point. The behaviour analyzer 102 may attempt to maximize the positive point to correctly predict the action of the user next time the user captures a photo. The personalized model 208 a may maximize the positive points based on the acceptance (positive points) or rejection (negative points) of the actions recommended by the behaviour analyzer 102. As an example, if the user accept to upload the photo after capturing the photo, the behaviour analyzer may be rewarded with a positive point. Whereas, if the user do not upload the photo after capturing the photo, the user may obtain a negative point. Based on these negative and positive points, the personalized model 208 *a* may be refined. The In another embodiment, the behaviour analyzer 102 may implement value iteration algorithm to figure out the action.

In another embodiment, an End to End Neural Network using an architecture consisting of Policy Gradient Deep Reinforcement Learning on top of a Deep Neural Network (DNN) may be applied. The DNN with attention can generate user behaviour embeddings on the offline user cluster behaviour data. The generic model then can be personalized for the user by adjusting the loss function in the Policy Gradient Deep Reinforcement Learning to predict the user actions.

In yet another embodiment, generalized model 208 *a* may be trained to do imitation learning for user clusters on the behaviour sequence data. The user behaviour can be trained by implementing one shot learning algorithm.

Referring to FIG. 4A, the behaviour analyzer 102 may continuously learn from interactions of users with the different applications, application 1 402 *a*, application 2 402 *b* and application 3 402 *c*, installed on the mobile 414. As an example, the application 1 402 *a* may be camera application, the application 2 402 *b* may be a photo editor and the application 3 402 *c* may be a social networking application. There may be more than 3 applications. At step 404, the location analyzer 104, the vision analyzer 106 and the text analyzer 108 may collect data and information from the different applications, application 1 402 *a*, application 2 402 *b* and application 3 402 *c*. As an example, the data and information stored may include images captured by the camera application (application 1 402 *a*), editing behaviour of the user in the photo editor (application 2 402 *b*), uploading behaviour of the user on the social networking application (application 3 402 *c*), different events stored in the calendar (application 4 (not shown)), and so on. At step 406, the data and information collected from the application 1 402 *a*, the application 2 402 *b* and the application 3 402 *c* may be stored in the memory component 112. At step 408, the data stored in the memory component 112 may be analysed by the application context analyzer 110. The application context analyzer 110 may analyse the context of the actions in which the user had previously carried out the follow up actions after carrying out a first action. The context of the action may be based on the location of the device where the action is carried out and/or characterizing information associated with the location where the action is carried out and/or the time at which the action is carried out and/or the scheduled event at the time at which the action is carried out. As an example, the user may only upload the photos that are captured, at morning, on a picnic spot and may not upload photos captured at the user's office or any other time. At step 410, the controller component 114 gathers the data and the information to determine the behaviour of the user. At step 412 *a* and 412 *b* the controller component 114 may recommend content and predict actions of the user if the context in which the first action is carried out correlates with the context in which the user had previously carried out the follow up action after carrying out the first action. As an example, the controller component 114 may gather the image from the camera application, editing behaviour from the photo editor application, uploading behaviour of user, at different events, from social networking application and event marked in calendar to arrive at the conclusion that the user may upload photos, if the photos are captured at a picnic spot at morning time.

Figure 4B:
Figure 4C:
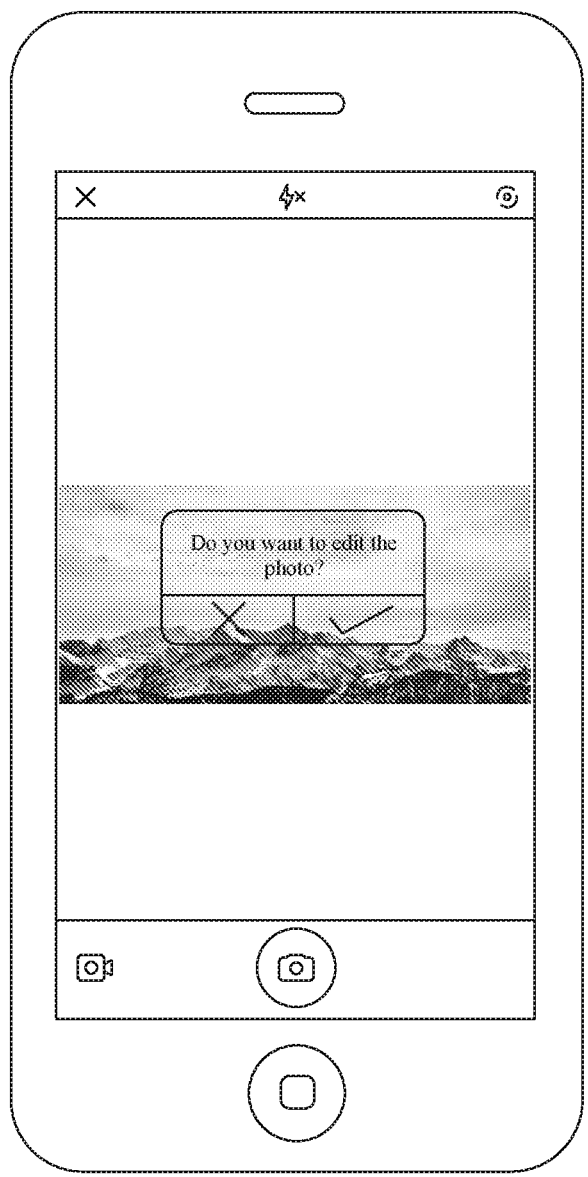

FIG. 4B, FIG. 4C, FIG. 4D and FIG. 4E illustrates an exemplary method of predicting user actions, by the behaviour analyzer 102. Referring to FIG. 4B, the user of the mobile 414 may open camera application (application 1 402 *a*) to capture photo on New Year. As soon as the user completes capturing the photo, the behaviour analyser 102 may send a pop-up 416 "Do you want to edit the photo?" (FIG. 4C). If the user wishes to edit the photo, he may select "✓".

Figure 4D:
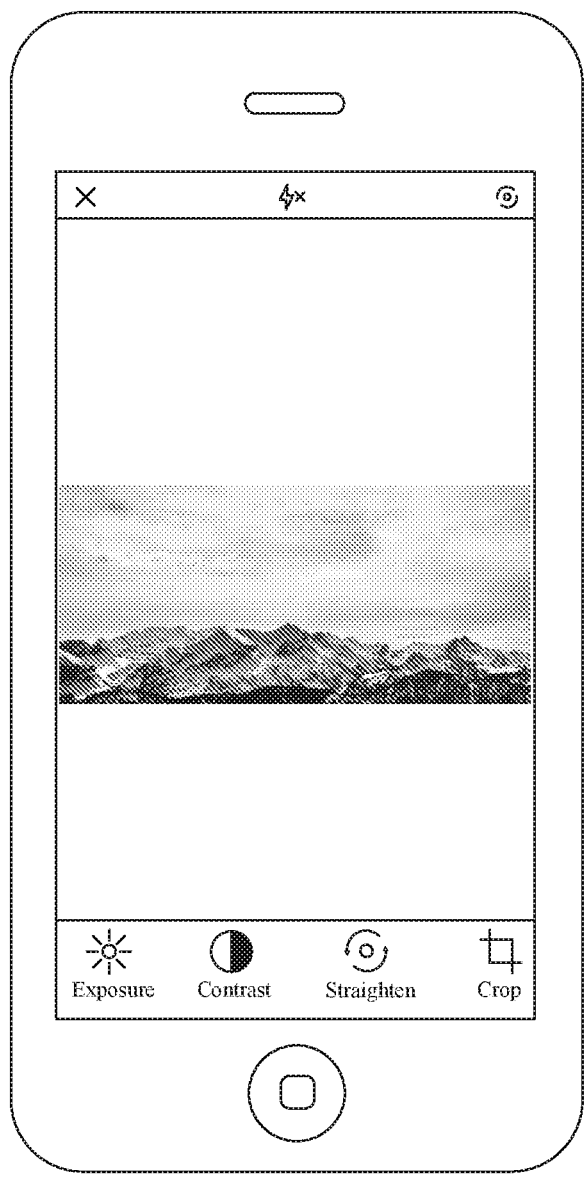
Figure 4E:
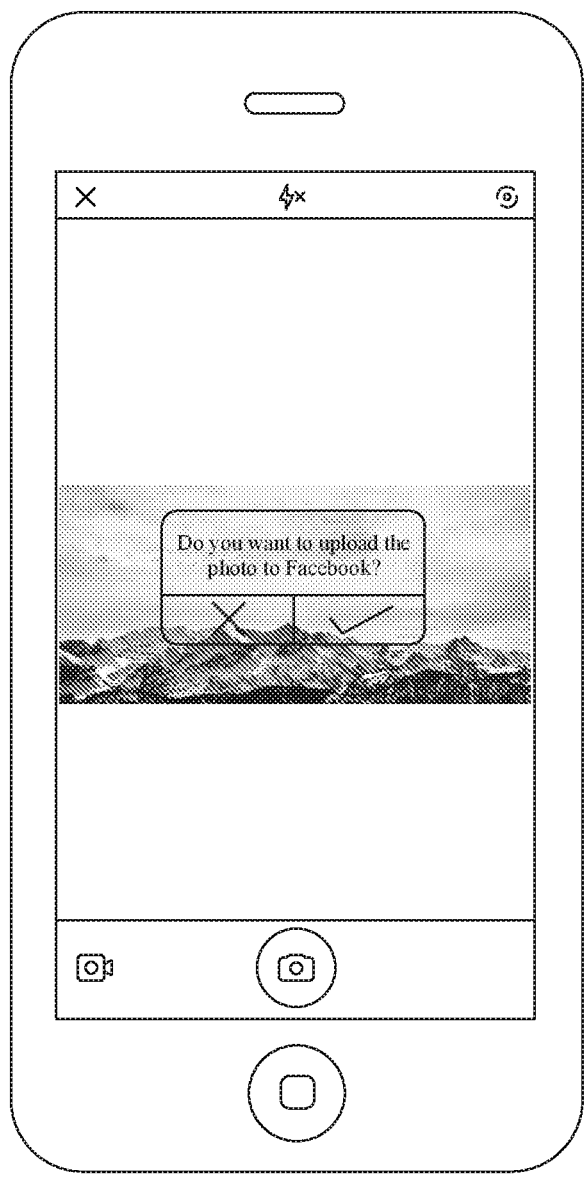
Figure 4F:
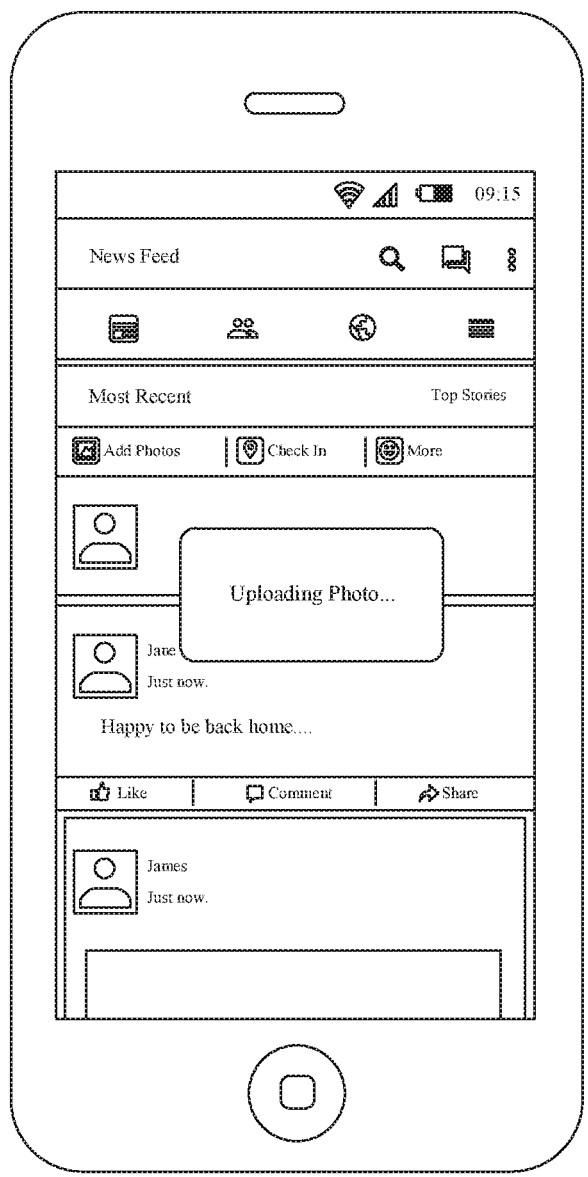

The behaviour analyzer 102 may open the photo editor application (application 2 402 *b*) for the user, wherein the user can edit the photo (FIG. 4D). Referring to FIG. 4E, on completion of photo edition, the behaviour analyzer may send another pop-up 418 "Do you want to upload the photo on FACEBOOK?". If the user wants to upload the photo on FACEBOOK, the user may select "✓" on which the behaviour analyzer 102 may upload the photo in the user's FACEBOOK (FIG. 4F). Referring to FIG. 4E, if the user do not wish to upload the photo in FACEBOOK, then he may select "x", on which the behaviour analyzer 102 may take the user back to the camera application. Referring to FIG. 4C, if the user do not want to edit the photo, then he may select "x", upon which the behaviour analyzer 102 may send a pop-up 418 "Do you want to upload the photo on FACEBOOK?" (FIG. 4E). The user may select "✓" if he wishes to upload the photo in FACEBOOK, on which the behaviour analyzer 102 may upload the photo in the user's account in FACEBOOK (FIG. 4F). If the user do not wish to upload the photo in FACEBOOK, then he may select "x", on which the behaviour analyzer 102 may take the user back to his camera application.

In conventional methods, to benefit from an application, the user may have to first open the application and then browse through the menu option available in the application. To successfully operate the application, the user should have a basic knowledge about method of operation of the application. Further, on facing any issues in browsing the application, the user may have to call the customer care to resolve the issue. In an embodiment, the behaviour analyzer 102 may act as a virtual agent for the user. The behaviour analyzer 102 may use embodiments mentioned in patent application Ser. No. 15/356,512, which is herein in cooperated by reference, to understand the context of the application and act as the virtual agent. The behaviour analyzer 102 may use the data from the location analyzer 104, the vision analyzer 106, the text analyzer 108, the application context analyzer 110, the memory component 112, the controller component 114 and the model manager 116 to extract information on the application context and may learn the intentions of the user from the user's past behaviour. The application context may include information about text and images in the applications, the contents in the application which the user is interested in and so on. Based on these, the behaviour analyzer 102 may answer questions about the services in the application. The behaviour analyzer 102 may also do actions on the application, on behalf of the user. The behaviour analyzer 102 may interact in natural language with the application. As an example, the user may be interested in ordering food online. The behaviour analyzer 102 may filter food in accordance with the past behaviour of the user. The behaviour analyzer 102 may also do other action such as placing the order, choosing the payment options, making payment and so on.

In an embodiment, the behaviour analyzer 102 may use imitation learning algorithm to execute actions in the application. Imitation learning algorithm take behavioural pattern of the user as input and will replicate the behaviour of the user to execute actions on behalf of the user. In another embodiment, the behaviour analyzer may execute actions on behalf of the user by implementing one shot learning. One shot learning require minimum amount of data as input to learn the behaviour of the user.

The behaviour analyzer 102 may act as a virtual agent for the ecommerce applications. The user of the ecommerce application, before purchasing a product may want to see how the product may look in a suitable environment. Such an experience is possible by Augmented reality. Augmented reality is an interactive experience of a real-world environment whereby elements of the virtual world is brought into the real world for enhancing the environment that the user experience. As an example, the user may purchase a sofa set from an ecommerce application such as AMAZON, FLIPKART and so on. In conventional approach, the user may have to choose the sofa set from the ecommerce application, open the camera application installed on user's mobile, point the camera at living room, drag the sofa set and then place the sofa set on the desired location to get a physical sense of how the sofa set fits in user's living room. The user may want to see how the product fits in his living room before finalizing on the product.

In an embodiment of the subject matter disclosed herein, the behaviour analyzer 102 may place the sofa set in the user's living room, on his mobile screen, to give a physical sense of how the sofa set looks in his living room.

In an embodiment, the behaviour analyzer 102 may act as a virtual agent, for executing the Augmented reality, for the ecommerce applications by first understanding the action and then completing the action. As an example, the action may be placing the sofa set on the user's living room.

In an embodiment, the behaviour analyzer 102 with access of data from the location analyzer 104, the text analyzer 108, the application context analyzer 110, the memory component 112, the controller component 114 and the model manager 116 may act as a virtual agent for the ecommerce application. The virtual agent may take the voice input of the user, convert the voice to text to understand the action intended by the user. Other information elements required for understanding the action may be figured out using slot filing algorithm. In an embodiment, additional context that may be helpful for the virtual agent may be provided manually by the user. The additional context may include bitmap of the physical visual images captured by the camera of the device, textual description of the image and so on.

In an embodiment, the virtual agent may be trained to understand the virtual image in an ecommerce application (example: Sofa set), the title and the category of the image, the physical context and the natural language utterance by implementation of Neural module network.

After understanding the actions, the behaviour analyzer 102 as an agent may need to complete the action. As an example, the behaviour analyzer 102 may move the sofa set from one corner of the living room to the other corner. The action can be completed by the virtual agent, manually, by taking the input given by the user in natural language voice input. The user may give input to the virtual agent, which in turn may convert the natural language voice input to text input and then complete the action.

In an embodiment, the virtual agent may complete the actions by itself. The virtual agent may be trained by Deep Neural Network algorithm to automatically complete the actions. In an embodiment, Deep Reinforcement Learning approach on top of Neural Modules may be used for natural language understanding, object detection and scene understanding to execute actions.

As an example, referring to FIG. 5, at step 502, the user opens an e-commerce application. The user may browse through different products available on the application and at step 504, the user may select a furniture for the user's living room. After the selection of the furniture, the user may provide voice instructions to the behaviour analyzer 102 for placing the furniture in the living room (step 506 *a*-step 508 *a*). Alternatively, the behaviour analyzer 102 may analyse the past behaviour of the user and suggest placing the furniture in the living room on behalf of the user (step 506 *b*-508 *b*).

In an embodiment, at step 506 *a*, the user may give voice instructions to the behaviour analyzer 102. The voice instructions of the user may be converted to text by the behaviour analyzer 102 to understand the intent of the user. At step 508 *a*, the behaviour analyzer 102 may place the furniture in accordance with the instruction provided by the user, in the image of the living room as displayed in the mobile screen of the user. At step 510, the user may get a visual experience of the furniture in the living room. If the user is satisfied with the product, the user may finalize on the product (512) for purchase.

In an embodiment, at step 506 *b*, the behaviour analyzer 102 may analyse the past behaviour of the user to complete the action intended by the user. At step 508 *b*, the behaviour analyzer 102 may place the furniture in the living room, in accordance with the past behaviour of the customer. At step 510, the user may get a visual experience of the furniture placed in the living room, on his mobile. If the user is satisfied with the product, at step 512, the user may finalize the product for purchase.

In another embodiment, the virtual agent may execute actions by training the virtual agent by implementation of Imitation learning.

Having provided the description of the different implementations of the system 100 for predicting the actions of the user and recommending contents based on user behavior, hardware elements of the system 100 is discussed in detail hereunder.

FIG. 6 is a block diagram illustrating hardware elements of the system 100 of FIG. 1, in accordance with an embodiment. The system 100 may be implemented using one or more servers, which may be referred to as server. The system 100 may include a 20 processing module 12, a memory module 14, an input/output module 16, a display module 18, a communication interface 20 and a bus 22 interconnecting all the modules of the system 100.

The processing module 12 is implemented in the form of one or more processors and may be implemented as appropriate in hardware, computer executable instructions, firmware, or combinations thereof. Computer-executable instruction or firmware implementations of the processing module 12 may include computer-executable or machine-executable instructions written in any suitable programming language to perform the various functions described.

The memory module 14 may include a permanent memory such as hard disk drive, may be configured to store data, and executable program instructions that are implemented by the processing module 12. The memory module 14 may be implemented in the form of a primary and a secondary memory. The memory module 14 may store additional data and program instructions that are loadable and executable on the processing module 12, as well as data generated during the execution of these programs. Further, the memory module 14 may be a volatile memory, such as a random access memory and/or a disk drive, or a non-volatile memory. The memory module 14 may comprise of removable memory such as a Compact Flash card, Memory Stick, Smart Media, Multimedia Card, Secure Digital memory, or any other memory storage that exists currently or may exist in the future.

The input/output module 16 may provide an interface for input devices such as computing devices, keypad, touch screen, mouse, and stylus among other input devices; and output devices such as speakers, printer, and additional displays among others. The input/output module 16 may be used to receive data or send data through the communication interface 20.

The input/output module 16 can include Liquid Crystal Displays (OLCD) or any other type of display currently existing or which may exist in the future.

The communication interface 20 may include a modem, a network interface card (such as Ethernet card), a communication port, and a Personal Computer Memory Card International Association (PCMCIA) slot, among others. The communication interface 20 may include devices supporting both wired and wireless protocols. Data in the form of electronic, electromagnetic, optical, among other signals may be transferred via the communication interface 20.

It should be understood, that the capabilities of the invention described in the present disclosure and elements shown in the figures may be implemented in various forms of hardware, firmware, software, recordable medium or combinations thereof.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus, the scope of the invention should be determined by the appended claims and their legal equivalents rather than by the examples given.

The invention claimed is:

1. A system for executing actions based on user input, the system comprising: a processor coupled to a memory, the processor configured to execute software to:
  analyze visual content associated with a user device;
  analyze a user's past behavior across one or more applications and natural-language utterances captured from a microphone of the user device;
  determine an intention of the user in using an application based on the analyzed visual content and past behavior, and the natural-language utterances; and
  execute, by a virtual agent, one or more actions within the application on behalf of the user based on the determined intention, wherein executing the one or more actions comprises executing one or more service-related tasks that includes at least one of completing a transaction for an item shown in the visual content and placing a food order to fulfill the determined intention,
  wherein the one or more service-related tasks comprise: placing the food order within a food delivery application, and wherein the virtual agent filters available food items based on past ordering behavior identified from the user's past behavior and completes the food order on behalf of the user based on a natural-language utterance captured from the user device.

* * * * *